(12) United States Patent
Guo et al.

(10) Patent No.: US 11,302,062 B2
(45) Date of Patent: Apr. 12, 2022

(54) METHOD FOR GENERATING AT LEAST ONE MERGED PERSPECTIVE VIEWING IMAGE OF A MOTOR VEHICLE AND AN ENVIRONMENTAL AREA OF THE MOTOR VEHICLE, A CAMERA SYSTEM AND A MOTOR VEHICLE

(71) Applicant: Connaught Electronics Ltd., Tuam (IE)

(72) Inventors: Huanqing Guo, Tuam (IE); Brian Michael Thomas Deegan, Tuam (IE); Vladimir Zlokolica, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 32 days.

(21) Appl. No.: 16/627,605

(22) PCT Filed: Jun. 25, 2018

(86) PCT No.: PCT/EP2018/066868
§ 371 (c)(1),
(2) Date: Dec. 30, 2019

(87) PCT Pub. No.: WO2019/002165
PCT Pub. Date: Jan. 3, 2019

(65) Prior Publication Data
US 2020/0151942 A1    May 14, 2020

(30) Foreign Application Priority Data

Jun. 30, 2017  (DE) .......................... 102017114611.3

(51) Int. Cl.
*G06T 15/20*     (2011.01)
*G06T 5/50*      (2006.01)

(52) U.S. Cl.
CPC ................ *G06T 15/20* (2013.01); *G06T 5/50* (2013.01); *G06T 2207/20221* (2013.01); *G06T 2207/30252* (2013.01)

(58) Field of Classification Search
CPC . G06T 15/20; G06T 5/50; G06T 2207/20221; G06T 2207/30252
See application file for complete search history.

(56) References Cited

U.S. PATENT DOCUMENTS 6,389,179 B1     5/2002 Katayama et al.
2006/0210191 A1  9/2006 Silverstein
(Continued)

FOREIGN PATENT DOCUMENTS

DE     102014110516 A1    1/2016

OTHER PUBLICATIONS

International Search Report and Written Opinion corresponding to International Application No. PCT/EP2018/066868, dated Sep. 25, 2018 (10 pages).

(Continued)

*Primary Examiner* — Terrell M Robinson
(74) *Attorney, Agent, or Firm* — Osha Bergman Watanabe & Burton LLP

(57) ABSTRACT

The invention relates to a method for generating at least one merged perspective viewing image (24), which shows a motor vehicle (1) and its environmental region (4) from a dynamically variable perspective (P1, P2, P3) of a dynamic virtual camera (12) and which is determined based on raw images (25) of at least two cameras (5a, 5b, 5c, 5d) and based on a perspective model (17) of the motor vehicle (1), comprising the steps of:
a) determining whether the merged perspective viewing image (24) comprises at least one disturbing signal afflicted image area, and if so, identifying the at least one disturbing signal afflicted image area;
b) (S63) determining a severity of disturbing signals (27) within the at least one disturbing signal afflicted image area;
c) (S61) determining a significance of the disturbing signals (27) in dependence on the perspective (P1, P2, P3) of the virtual camera (12);
d) (S62) determining a degree of coverage of the disturbing signal afflicted image area by the model (17) of the motor vehicle (1) in dependence on the perspective (P1, P2, P3) of the virtual camera (12);
e) (35) reducing the disturbing signals (27) only, if the severity exceeds a predetermined severity-threshold and the significance exceeds a predetermined significance-threshold (Continued)

Figure 1:
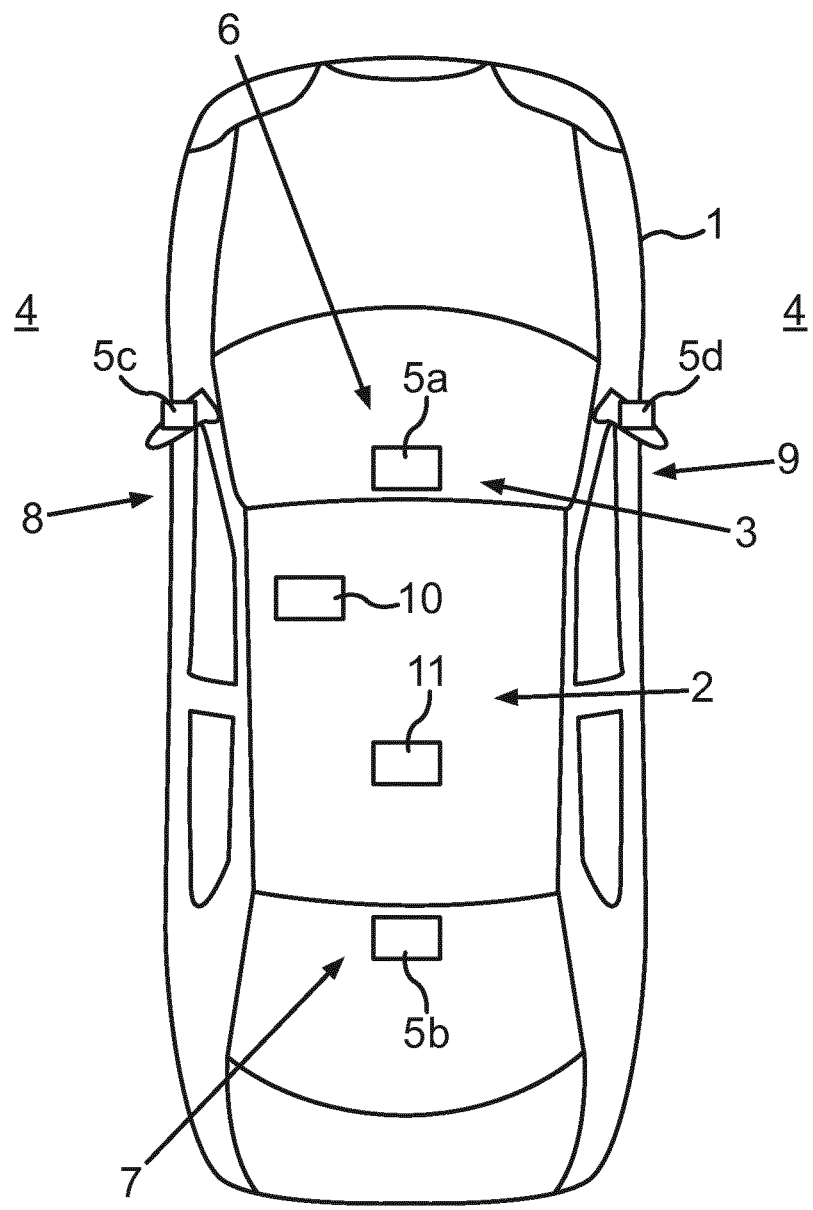

and the degree of coverage remains below a predetermined degree of coverage-threshold.

The invention moreover relates to a camera system (3) as well as a motor vehicle (1).

15 Claims, 8 Drawing Sheets

(56) References Cited

U.S. PATENT DOCUMENTS

| | | |
|---|---|---|
| 2008/0144966 A1 | 6/2008 | Steinberg et al. |
| 2011/0261050 A1 | 10/2011 | Smolic et al. |
| 2012/0086807 A1* | 4/2012 | Simon ................ H04N 5/23293 |
| | | 348/148 |
| 2014/0333729 A1* | 11/2014 | Pflug ....................... G06T 15/20 |
| | | 348/47 |
| 2015/0178884 A1 | 6/2015 | Scholl et al. |
| 2017/0004622 A1 | 1/2017 | Adsumilli et al. |
| 2018/0232851 A1* | 8/2018 | Scholl ....................... B60R 1/00 |
| 2019/0005709 A1* | 1/2019 | Kim ..................... H04N 19/117 |
| 2020/0036952 A1* | 1/2020 | Iwane ..................... G06T 15/20 |

OTHER PUBLICATIONS

German Search Report issued in corresponding German Appliation No. 10 2017 114 611.3, dated May 3, 2018 (8 pages).

\* cited by examiner

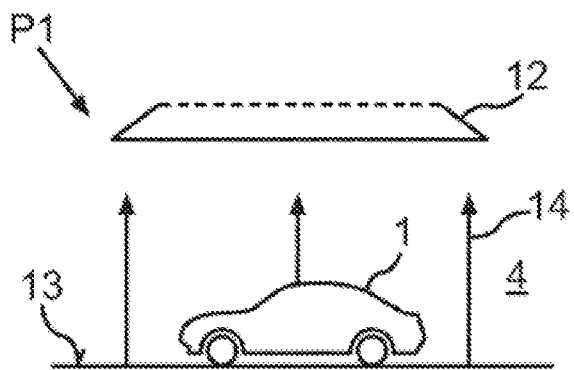
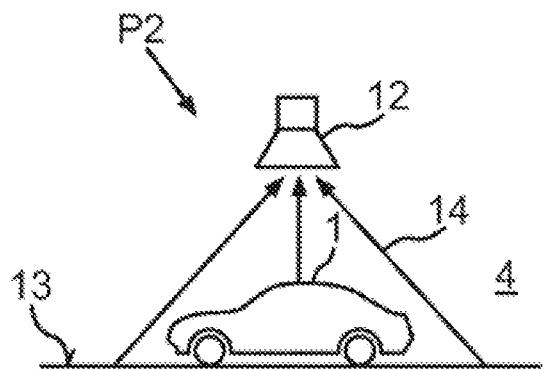
Fig.2a     Fig.2b
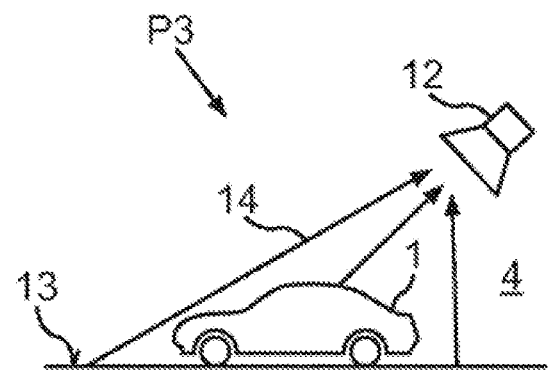
Fig.2c
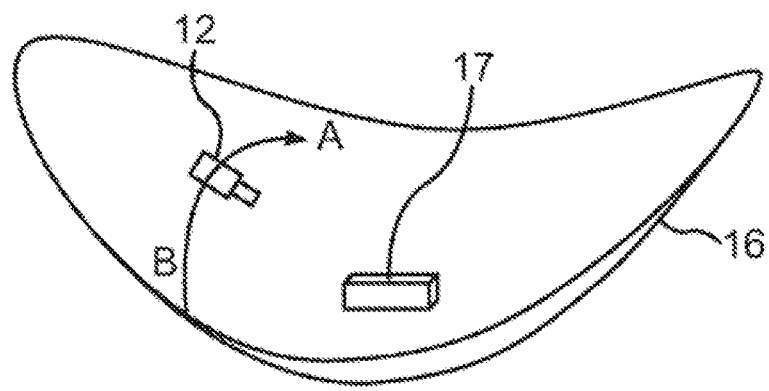
Fig.3

METHOD FOR GENERATING AT LEAST ONE MERGED PERSPECTIVE VIEWING IMAGE OF A MOTOR VEHICLE AND AN ENVIRONMENTAL AREA OF THE MOTOR VEHICLE, A CAMERA SYSTEM AND A MOTOR VEHICLE

The invention relates to a method for generating at least one merged perspective viewing image, which shows a motor vehicle and an environmental region of the motor vehicle from a dynamically variable perspective of a dynamic virtual camera and which is determined based on raw images of at least two vehicle-side cameras and based on perspective model of the motor vehicle dependent on the perspective of the virtual camera. The invention moreover relates to a camera system as well as to a motor vehicle.

It is already known from the prior art to monitor an environmental region a motor vehicle by means of cameras of a camera system of the motor vehicle, for example a surround view camera system. For this purpose, the cameras can capture raw images or raw image data from the environmental region, which can be displayed to a driver of the motor vehicle on a display device of the motor vehicle, for example a screen. Three-dimensional representations of the environmental region from a so-called third-person perspective are also increasingly displayed on the display device. Such a third-person perspective shows the environmental region of the motor vehicle as well as the motor vehicle itself from the perspective of a vehicle-external observer, a so-called virtual camera.

Such perspective images of the environmental region from the third-person perspective can be generated by merging the raw images detected by the cameras of the camera system, whereby the merging and thus the resulting perspective image view are dependent on the perspective of the virtual camera. The merged perspective viewing image gives the impression of being captured by a real camera in a pose of the virtual camera. Such a merged perspective viewing image can, for example, be a plan view in which the observer looks vertically downwards on the motor vehicle from above. The virtual camera is therefore arranged along a motor vehicle vertical axis above the motor vehicle and is orientated toward the motor vehicle. This top view image can be displayed on the display device and shows an upper side of the motor vehicle with the vehicle roof as well as the environmental region surrounding the motor vehicle, in particular a road surface.

In this case, it is possible for the merged perspective viewing image to have disturbing signals, which are also referred to as aliasing-effect aliasing. These disturbing signals can, for example, be artificial flickering effects in the image displayed on the display device.

These flickering effects usually occur in image areas of the merged perspective viewing image, which show a bottom area of the environmental region near the motor vehicle, in particular when the motor vehicle is moving. These flickering effects displayed on the display device deteriorate an image quality of the merged perspective viewing image displayed to the driver and can be disturbing to the driver. Anti-aliasing methods are known from the prior art for reducing the disturbing signals. However, these can comprise high computational cost, in particular when the images of the environmental region should be displayed to the driver in real-time.

It is the object of the present invention to provide a solution as to how high-quality, merged perspective viewing images of a motor vehicle and an environmental region of the motor vehicle can be generated quickly and without great computational effort.

According to the invention, this object is solved by a method, by a camera system and by a motor vehicle having the features according to the respective independent patent claims. Advantageous embodiments of the invention are the subject of the dependent patent claims, the description and the figures.

According to one embodiment of a method at least one merged perspective viewing image is generated, which shows a motor vehicle and an environmental region of the motor vehicle from a dynamically variable perspective of a dynamic virtual camera, wherein the merged perspective viewing image is determined in particular based on raw images of at least two vehicle-side cameras as well as based on a perspective model dependent on the perspective of the virtual camera. In a step a) it is in particular determined whether the merged perspective viewing image comprises at least one disturbing signal afflicted image area, and, if so, the at least one disturbing image afflicted image area is identified in the merged perspective viewing image. In a step b) a severity of disturbing signals in the at least one disturbing signal afflicted image area can be determined and in a step c) a significance of the disturbing signals can be determined in dependence on the perspective of the virtual camera, wherein at least one geometric parameter of the image area with the perspective of the virtual camera is characterized by the significance. In particular, in a step d), a degree of coverage of the disturbing signal afflicted image area by the model of the motor vehicle to be inserted into the merged perspective viewing image is determined in dependence on the perspective of the virtual camera. In particular, the disturbing signals for the merged perspective viewing image are only reduced in a step e) if the severity of the disturbing signals exceeds a predetermined severity-threshold and the significance of the disturbing signals exceeds a predetermined significance-threshold and the degree of coverage remains below a predetermined degree of coverage-threshold.

According to a particularly preferred embodiment of a method at least one merged perspective image is generated, which shows a motor vehicle and an environmental region of the motor vehicle from a dynamically variable perspective of a dynamic virtual camera, wherein the merged perspective viewing image is determined based on raw images of at least two vehicle-side cameras and based on a perspective model of the motor vehicle dependent on the perspective of the virtual camera. In a step a) it is determined whether the merged perspective image comprises at least one disturbing signal afflicted viewing image within the merged perspective viewing image. In a step b) a severity of disturbing signals within the at least one disturbing signal afflicted image area is determined and in a step c) a significance of the disturbing signals is determined in dependence on the perspective of the virtual camera, wherein at least one geometric parameter of the image area with the perspective of the virtual camera is characterized by the significance. Moreover, in a step d), a degree of coverage of the disturbing signal afflicted image area by the model of the motor vehicle to be inserted into the merged perspective viewing image is determined in dependence on the perspective of the virtual camera. The disturbing signals for the merged perspective viewing image are only reduced in a step e) if the severity of the disturbing signals exceeds a predetermined severity-threshold and the significance of the disturbing signals exceeds a predetermined significance-threshold and the degree of coverage remains below a predetermined degree of coverage-threshold.

By means of the method high quality perspective viewing images can be generated, which show the motor vehicle and the environmental region surrounding the motor vehicle from the perspective of the virtual camera. The perspective images can be displayed to a driver of the motor vehicle in the form of a video sequence, in particular a real time video. The perspective images are generated by the raw images, which are captured by the at least two vehicle-side cameras. For generating or rendering the perspective images the raw images are merged, for instance by a vehicle-side image processing device. The merging of the raw images to the perspective viewing image is used here in the same way with the capture of the perspective viewing image by the virtual camera.

In particular, the raw images are captured by a wide-angle multi-camera system of the motor vehicle with a high resolution. The multi-camera system can for instance be configured as a surround view camera system with four cameras mounted on the motor vehicle. The surround view camera system may comprise a front camera for capturing raw images from the environmental region in front of the motor vehicle, a rear camera or a reversing camera for capturing raw images from an environmental region behind the motor vehicle and two side cameras for capturing raw images from the environmental region next to the motor vehicle. In order to enlarge detection ranges of the cameras, the cameras can comprise wide-angle lenses, for instance fish eye lenses. The raw images as well as the merged perspective viewing images can be displayed on a display device of the motor vehicle so that the driver can capture the environmental region looking at the display device. Thus, the driver can be assisted in maneuvering the motor vehicle, for instance when parking. The surround view camera system and the display device form a camera monitoring system (CMS), which for instance can also replace side mirrors of the motor vehicle.

As the merged perspective viewing image here an image is generated, which shows the environmental region from the dynamically variable perspective of the dynamically virtual camera. This means that a position of the virtual camera as well as an orientation of the virtual camera relative to the motor vehicle, i.e. a pose of the dynamically virtual camera can change. In this case for instance a sequence from a plurality of merged perspective viewing images can be generated from the raw images of the cameras, which shows the environmental region from various perspectives and thus gives the impression as if the virtual camera was flying above the motor vehicle and around the motor vehicle during capturing the perspective viewing images. A motion path or a flight path of the virtual camera can for instance be predetermined. Since the motor vehicle itself cannot be captured by the camera, the model of the motor vehicle is inserted into the merged images. The model of the modelled motor vehicle is also dependent on the current perspective of the virtual camera. The model of the motor vehicle consequently can change with the perspective of the virtual camera.

Preferably, for generating the merged perspective viewing image, the raw images are projected upon a predetermined curved surface, wherein the model of the motor vehicle is positioned in a predetermined position of the surface and the merged perspective viewing image is determined on the basis of the surface with the projected raw images and the model of the motor vehicle as well as based on the perspective of the dynamic virtual camera. Thus, in particular, a so-called bowl view is generated as the merged perspective image. The curved surface can for instance be determined or indicated via a fourth degree polynomial. The model of the motor vehicle can for instance be positioned in a middle of the curved surface.

The merged perspective viewing images can comprise disturbing signals or aliasing, which can be suppressed or mitigated by anti-aliasing methods. These disturbing signals are in particular not present in the raw images, but are inserted during generating the merged perspective viewing images, in particular if the motor vehicle and/or the virtual camera move. In order to save computing resources during generating the merged perspective viewing images, it is determined whether the merged perspective viewing images will comprise disturbing signals at all. Whether disturbing signals occur is, in particular, dependent on the specific camera system and/or environmental conditions in the environmental region of the motor vehicle. In case the merged perspective viewing images comprise image areas with disturbing signals, these are identified for instance in that a position of the image areas in the merged perspective viewing image is determined. Then, the severity of the disturbing signals within the disturbing signal afflicted image area is determined. The severity describes whether the disturbing signals in the image area are strong enough to be visible in the merged perspective viewing image at all. In this case, it is assumed that the disturbing signals in the image area are strong or severe enough and thus visible when the severity exceeds the predetermined severity-threshold. The severity of the disturbing signals is in particular dependent on the real cameras of the camera system.

Moreover, the significance of the disturbing signals is determined. The significance is in particular a measure, which is dependent on the virtual camera. The significance describes the change of the at least one geometrical parameter of the image area at a reference perspective of the virtual camera, for instance the perspective for generating a top view, versus a perspective differing from the reference perspective, for instance for generating a rear view of the motor vehicle. Thus, the significance describes in particular how the disturbing signal afflicted image area changes in dependence on a change of perspective of the virtual camera. Then it is determined whether the disturbing signals, even if the severity exceeds the severity-threshold, are visible in the image area of the merged perspective viewing image depending on the current perspective of the virtual camera at all. If the significance exceeds the predetermined significance-threshold, it is assumed that the disturbing signals within the disturbing signal afflicted image area are significant enough and thus visible.

In particular a size and/or a shape and/or a position of the at least one disturbing signal afflicted image area within the merged perspective image at the perspective of the dynamic virtual camera is determined as the significance depending on the perspective of the dynamic virtual camera. For example, the significance-threshold is not reached if the size of the disturbing signal afflicted image area is so small due to the current perspective of the virtual camera in the perspective image that the disturbing signals are not or only barely visible. It is also possible that a position and/or a shape of the image area changes as a result of the perspective of the virtual camera in such a way that the disturbing signals are attenuated or even removed. For example, it may be that the image area and thus the disturbing signals are not visible at all, since the image area does not lie in the detection range of the virtual camera due to the predetermined perspective of the virtual camera.

Moreover, the degree of coverage of the disturbing signal afflicted image area is affected by the model of the motor vehicle. In the merged perspective viewing image, which shows the environmental region in particular from a random, variable perspective of the virtual camera, it may happen that the disturbing signals of the image area, even though they are in particular severe enough and significant enough, are not visible, because the image area is at least partially covered by the perspective model of the motor vehicle. The degree of coverage is determined in particular by a transparency degree of the model as well as by a perspective-dependent shape of the model. Thus, it may for instance be the case that the disturbing signal afflicted image area is at least partially covered by the perspective-dependent shape of the model, but the model is shown transparent, and therefore the disturbing signals are still visible. This, in particular composed, degree of coverage is determined and compared with the predetermined degree of coverage-threshold. If the degree of coverage remains below the predetermined degree of coverage-threshold, that is for instance if the model of the motor vehicle is too transparent or the perspective shape of the model does not protrude into the disturbing signal afflicted image area, it is assumed that the disturbing signals are visible in the merged image.

By determining the severity, the significance as well as the degree of coverage a necessity of the reduction of the disturbing signals can thus be determined. Thus, if it is detected or confirmed that disturbing signals are visible in the merged image, the disturbing signals are reduced or an anti-aliasing is performed. In case the severity remains below the severity-threshold or the significance remains below the significance-threshold or the degree of coverage exceeds the degree of coverage-threshold, a reduction of the disturbing signals is avoided. Thus, computational resources can advantageously be saved in determining the merged perspective viewing images. Thereby, a particularly low-cost camera system for a motor vehicle can be realized, since disturbing signals are only reduced if the necessity of the reduction of the disturbing signals was recognized.

Preferably, the disturbing signals in the raw images and/or in the merged perspective viewing image are reduced, wherein the steps a) to d) are performed on the basis of the raw images predictively prior to generating the merged perspective viewing image, in case the disturbing signals are reduced at least in the raw images. The reduction of the disturbing images in the raw images corresponds to a pre-filtering and the reduction of the disturbing signals in the merged perspective viewing image corresponds to a post processing. In order to be able to reduce disturbing images already in the raw images, it is predicted whether the merged perspective viewing image will comprise the at least one disturbing signal afflicted image area. Moreover, the severity of the disturbing signals, the significance of the disturbing signals, and the degree of coverage of the disturbing signal afflicted image area by the model of the motor vehicle is predicted. Thus, disturbing signals can be reduced already during the generation of the perspective viewing image from the raw images, i.e. during the capturing of the perspective viewing image by the virtual camera. Therefore, the high quality perspective viewing image is present particularly fast for display on the display device. This is particularly advantageous, for instance, for real time applications.

In a further development of the invention in step a) at least one environmental condition, in particular a texture of a road surface for the motor vehicle and/or a time of the day and/or weather conditions, are determined and it is predicted based on the at least one environmental condition whether the merged perspective viewing image comprises the at least one disturbing signal afflicted image area. This embodiment is based on the insight that the occurrence of aliasing effects are dependent on the environmental conditions in the environmental region of the motor vehicle. If for instance the road surface is covered by a water film, the disturbing signals are very low due to the reduced contrast of the reflections caused by the water film on the road surface. Also, the water film can cover the lenses of the cameras, whereby the cameras capture blurred raw images. A merged perspective viewing image, which is determined on the basis of the blurred raw images, comprises in particular reduced disturbing images. A texture of the road surface, which reduces disturbing signals in the form of artificial flicker in the merged perspective viewing images, can be formed in the form of particularly small or particularly large road gravel. Moreover the case of low light levels, such as for instance during night rides or in the shadow of the motor vehicle, disturbing signals in the perspective images are hardly visible. In these cases the reduction of disturbing signals can be avoided.

In an advantageous embodiment of the invention, in step a) a disturbing signal indicator is determined and a presence of the at least one disturbing signal afflicted image area as well as a position of the image area in the merged perspective viewing image are determined on the basis of the disturbing signal indicator, wherein in step b) the severity of the disturbing signals is determined on the basis of the disturbing signal indicator. The disturbing signal indicator serves in particular for distinguishing disturbing signal free image areas from disturbing signal afflicted image areas. By the disturbing signal indicator it can be indicated whether disturbing signals or aliasing occur in the specific cameras at all. The disturbing signal indicator consequently is dependent on the real cameras, in particular, however, not by the virtual camera. The disturbing signal indicator can be determined on the basis of the raw images and/or on the basis of the merged image. Based on this disturbing signal indicator, the disturbing signal afflicted image area can be identified in the at least one merged perspective viewing image, for instance the position of the disturbing signal afflicted image area. Moreover, the severity of the disturbing signals can be determined, in particular predicted, based on the disturbing signal indicator.

It can be provided that a pixel density map is determined in dependence on the at least one camera parameter of the cameras as the disturbing signal indicator, which pixel density map describes an image area depending distribution of a number of pixels of the raw images contributing to the creation of the merged perspective viewing image, wherein a maximum pixel density value within the pixel density map is determined as the severity of the disturbing signals. The pixel density map corresponds to a spatial distribution of pixel densities, which describe a number of pixels in the raw images contributing to the generating of an image area in the merged perspective viewing image. The image area images a certain environmental sub-region or region of interest (ROI) of the environmental region. The region of interest is for instance an environmental sub-region of the road surface. The distribution can for instance be determined by subdividing the environmental region, for instance the road surface, into environmental sub-regions. For each environmental sub-region, a ratio between a number of pixels of the raw images, which are used for the representation of the respective environmental sub-region in the merged perspective viewing image, and a number of pixels of the merged perspective viewing image can be determined. In other words the environmental region is subdivided, a certain environmental sub-region is selected within the environmental region and it is determined how many pixels this certain environmental sub-region occupies in the raw images and the merged perspective viewing images. The pixel density consequently is a measure for measuring the pixel ratio of the raw images relative to the merged perspective viewing images.

The pixel ratio is dependent on extrinsic and intrinsic camera parameters of the cameras so that the pixel density map is generated in dependence on the camera parameters. For instance, a pixel density map can be determined for every camera or a pixel density map can be determined for the entire camera system. The extrinsic camera parameters describe a spatial position, i.e. a position as well as an orientation, of the camera in a world coordinate system and establish a relation between the world coordinate system and a camera coordinate system. The intrinsic camera parameters establish a relation between camera coordinate system and an image coordinate system of the raw images and the merged perspective viewing images. As intrinsic camera parameters, for instance, a focal length of the camera, coordinates of an image center as well as pixel scaling in both image coordinate directions can be indicated.

Based on the pixel density map, therefore, both a position of the disturbing signal afflicted image area and a severity of the disturbing signals can be determined in the disturbing signal afflicted image area. The pixel density map can be divided into pixel density ranges, each pixel density range corresponding to an image area within the perspective viewing image. The higher a pixel density of a pixel density range, the severer or stronger are the disturbing signals in the image area of the perspective image corresponding to the pixel density range. Thus, that image area can be identified as the disturbing signal afflicted image area which has the highest pixel densities according to the pixel density map. This maximum pixel density can simultaneously be identified as the severity of the disturbing signals and can be compared with the predetermined severity-threshold. For example, the pixel densities in image areas which represent target regions near the cameras are greater than pixel densities in image areas which represent target regions far from the cameras. Thus, the disturbing signal afflicted image areas in particular image environmental sub-regions of the environmental region close to the real cameras.

Alternatively or additionally, as the disturbing signal indicator, at least one measure describing a statistical dispersion of pixel values is determined as function of a position of pixels in the raw images and/or in the merged perspective viewing image, wherein the severity of the disturbing signals is determined on the basis of a relative value of the at least one measure. According to this embodiment, the disturbing signal indicator is thus determined on the basis of variances or dispersions of pixel values, in particular brightness values. This embodiment is based on the realization that pixel values in disturbing signal afflicted image areas comprise significantly higher dispersion than pixel values in disturbing signal free image areas. The statistical measures or statistical indices by which the statistical dispersion is characterized can be, for example, a data range, a standard deviation, a distance standard deviation at the distances, an average absolute deviation, a variation coefficient, a relative mean difference, etc. The higher the statistical indices are, the greater the dispersion in the pixel values. The severity of the aliasing can be evaluated by a relative value of the statistical indices.

The use of the statistical indices for determining the disturbing signal indicator is particularly advantageous when the disturbing signal indicator cannot be determined accurately or reliably based on the pixel density map. In particular, since the pixel density is a ratio determined based on a camera pinhole model and based on linear ray tracing calculations, a variety of other conditions such as the presence of an object in the environmental region, a shape of the objects, dimensions of the objects, a brightness and a color of the region of interest, the different camera lens properties, etc., are not taken into account.

Alternatively or additionally, it can be provided that the disturbing signal indicator is determined by means of a frequency analysis of pixel values of the raw images and/or the merged perspective viewing image. Since the aliasing effect refers to errors in the signal processing which occur during the sampling of signals with high-frequency components, which are in particular higher than half the sampling frequency, the disturbing signal indicator can also be determined by analyzing the raw images and/or the perspective viewing images in the frequency domain. Both spatial frequencies within a single raw image and/or within a single perspective viewing image can be considered as well as frequencies in the time domain can be considered within a temporal sequence of images.

In a further development of the invention, in dependence on a vehicle-side screen for displaying the merged perspective viewing image, as the disturbing signal indicator, respective screen areas corresponding to a certain environmental sub-region in the environmental region are determined. A size of that screen area is determined as the severity of the disturbing signals, which is occupied by the environmental sub-region corresponding to the disturbing signal afflicted image area during display on the screen. The disturbing signal indicator can thus also be dependent on the specific display device on which the perspective viewing images are displayed. In this case, it is examined whether the merged perspective viewing image has the disturbing signals while being displayed on the screen. This means, for example, that the merged perspective viewing image admittedly has the disturbing signals, which are both severe enough as well as significant enough and un-covered, but the disturbing signals are not visible on the specific screen with its specific screen parameters. If the disturbing signals are not visible on the specific screen, although they are actually present, a reduction of the disturbing signals can be avoided. Thus, computing performance as well as computation time can be economically saved in determining the merged perspective viewing images.

It proves to be advantageous if a test disturbing signal indicator is determined during at least one test cycle, wherein a relation between positions of predetermined environmental sub-regions in the environmental region and values of the test disturbing indicator is determined, and the severity threshold is determined on the basis of the relation. In particular, the test cycle is performed during a so-called pre-product stage, in which the specific camera system is not yet delivered to an end customer. By means of the test cycle, it can be advantageously checked whether anti-aliasing methods are necessary at all in a particular camera system. In addition, it is possible to find out when disturbing signals are to be reduced in a particular camera system, i.e. within the raw images or only within the perspective viewing images. It can thus be determined whether pre-filtering or post-processing achieves the desired results, namely the determination of a high-quality perspective viewing image. For this purpose, raw images can be captured in the test cycle and the perspective viewing images can be determined using the settings of the virtual camera, for example the pose of the virtual camera. If disturbing signals occur in the perspective viewing images determined with the test cycle, the test disturbing signal indicator can be determined based on the raw images and/or based on the perspective viewing images. Based on the test disturbing signal indicator, the specific severity threshold for this particular camera system can then be determined. Thus, the anti-aliasing can be adapted specifically to the respective camera systems so that an end user can be provided with camera systems which can generate qualitatively particularly high-quality perspective viewing images In a particularly advantageous embodiment, for reducing the disturbing signals in the merged perspective viewing image, in a step f) a contrast enhancement and/or an edge enhancement for the captured raw images is suppressed or mitigated in case of cameras equipped with integrated enhancement functions and the merged perspective viewing image is determined on the basis of the raw images without the contrast enhancement and/or edge enhancement. Alternatively or additionally to step f), in a step g) focusing errors are generated within the captured raw images and the merged perspective viewing image is determined on the basis of the raw images with the focusing errors. Alternatively or additionally to step f) and/or step g), in a step h) a filter is applied to pixels corresponding with the disturbing signal afflicted image area of the merged perspective viewing image and/or the raw images.

Thus, if it has been detected by means of steps a) to e) that a reduction of the disturbing signals for the merged perspective viewing image is necessary, at least one of steps f) to h) is carried out. In step f), integrated enhancement functions or enhancement features of the cameras are turned off or reduced. Most cameras or camera systems include integrated image processing units with built-in contrast enhancements and/or edge enhancements. Even if the disturbing signals are not generated by the integrated enhancement functions, these enhancement functions can exacerbate the severity of the disturbing signals. The image processing units of the cameras can, for example, be controlled by the vehicle-side image processing device, whereupon the enhancement functions are not applied to the raw images. In this way, unprocessed raw images for producing the merged perspective viewing image are provided to the image processing device. By suppressing or at least mitigating these enhancement functions of the cameras and determining the merged perspective viewing images on the basis of the unprocessed raw images, the introduction of disturbing signals into the merged perspective viewing images can be easily avoided or reduced.

Alternatively or additionally, step g), which relates to an optical method, can be carried out. In step g), the focusing error or a focusing offset is intentionally generated within the raw images. The focusing error is visible in the form of blurred images of the cameras, the optical blurring reducing the high-frequency signals and thus the aliasing in the merged perspective viewing images determined on the basis of the blurred raw images. The focusing error in the raw images can be generated, for example, by providing a misalignment of lenses of the cameras. The raw images are thus detected by cameras with misaligned lenses. For this purpose, the lenses, for example the fish eye lenses, can be slightly displaced from their nominal position in order to achieve a focus offset and therefore misaligned lenses. The lenses can be misaligned during manufacture of the cameras or during mounting of the cameras on the motor vehicle. Thus, the cameras include a built-in lens misalignment and can capture blurred raw images. Within these blurred raw images, high frequencies of the pixel luminance are smoothed and, consequently, the disturbing signals are reduced within the perspective viewing images.

Steps f) and g) are performed before generating the merged perspective viewing image, and thus can be seen as preventative measures to avoid the introduction of disturbing signals into the merged perspective viewing image.

Alternatively or additionally, step h) which relates to an image processing method can be carried out. Within this step h), the at least one disturbing signal afflicted image area in the merged perspective viewing image is filtered. In particular, image elements or pixels are filtered within this image area of the merged perspective viewing image and/or image elements of the raw images which contribute to the relevant image area. Step h) can be performed before generating the merged perspective viewing image by applying the filter to the raw images and/or after generating the merged perspective viewing image by applying the filter to the merged perspective viewing image. It can be provided, that the pixel density map is used for guiding the filter. Weighting factors can be determined depending on the pixel density map for weighting the pixels of the raw images and/or of the merged perspective viewing image. The pixel density map thus serves as a so-called guide image for a guided filter, by means of which the image processing operation of the filter can be restricted locally. Thus, a smooth transition between the image areas afflicted with disturbing signals and image areas without disturbing signals can advantageously be ensured.

When a necessity of the disturbing signal reduction has been determined from steps a) to e), the image quality of the merged perspective viewing image displayed to the driver can be improved by performing at least one of steps f) to h), in particular all steps f) to h). Therefore, the visual quality for the driver can be increased.

Preferably it is determined whether the disturbing signals result from a movement of the motor vehicle and/or a movement of the virtual camera, and in the case that the disturbing signals only result from a movement of the virtual camera, the disturbing signals are reduced by performing an averaging of adjacent pixels in the merged perspective viewing image. According to this embodiment, a source of the disturbing signals is detected. If the disturbing signals do not result from a movement of the motor vehicle, but merely from a movement of the virtual camera, a simplified disturbing signal reduction or a simplified anti-aliasing can be performed. Thus, none of the steps f) to h) is carried out, but only an averaging of neighboring pixels is performed in the merged perspective viewing image. For example, it can be detected whether the motor vehicle is static or stationary at the time of recording the raw images. In this case, the motor vehicle does not move. The virtual camera moves particularly when a video sequence of merged perspective viewing images is generated, in which the virtual camera flies over the motor vehicle during the capturing of the perspective viewing images. By detecting a source of the disturbing signals, the appropriate, optionally simplified variant for reducing the disturbing signals can advantageously be selected and thus computation time can be saved.

The invention also relates to a camera system for a motor vehicle comprising at least two cameras for detecting raw images from an environmental region of the motor vehicle and an image processing device which is designed to carry out a method according to the invention or an advantageous embodiment thereof. The camera system may additionally comprise a display device, for example a screen, for displaying the merged perspective viewing image with reduced disturbing signals produced by the image processing device. In particular, the camera system is designed as a surround view camera system and comprises at least four cameras for positioning on the motor vehicle and for detecting raw images from the environmental region around the motor vehicle. The cameras have, in particular, wide-angle lenses, for example fish-eye lenses.

A motor vehicle according to the invention comprises a camera system according to the invention. The motor vehicle is designed in particular as a passenger car.

The preferred embodiments presented with reference to the method according to the invention and their advantages apply correspondingly to the camera system according to the invention and to the motor vehicle according to the invention.

By indications "in front of", "behind", "next", "over", "left", "right" positions and orientations from the perspective of an observer standing in front of the vehicle and looking in the longitudinal direction of the vehicle are indicated.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

The invention is explained in more detail on the basis of preferred exemplary embodiments and with reference to the attached drawings.

Figure 4:
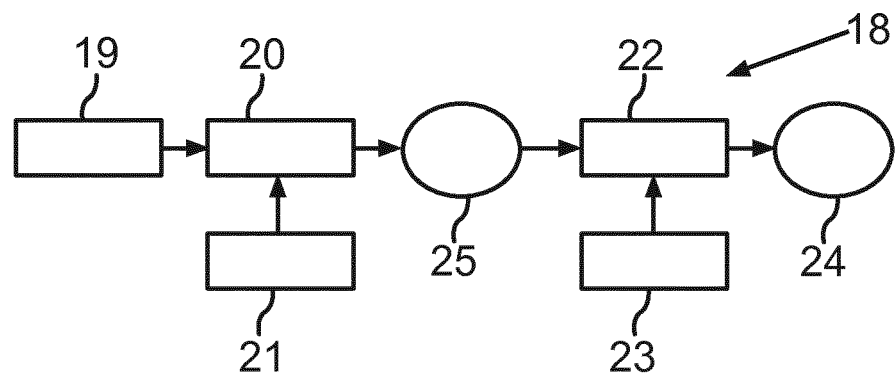
Figure 5:
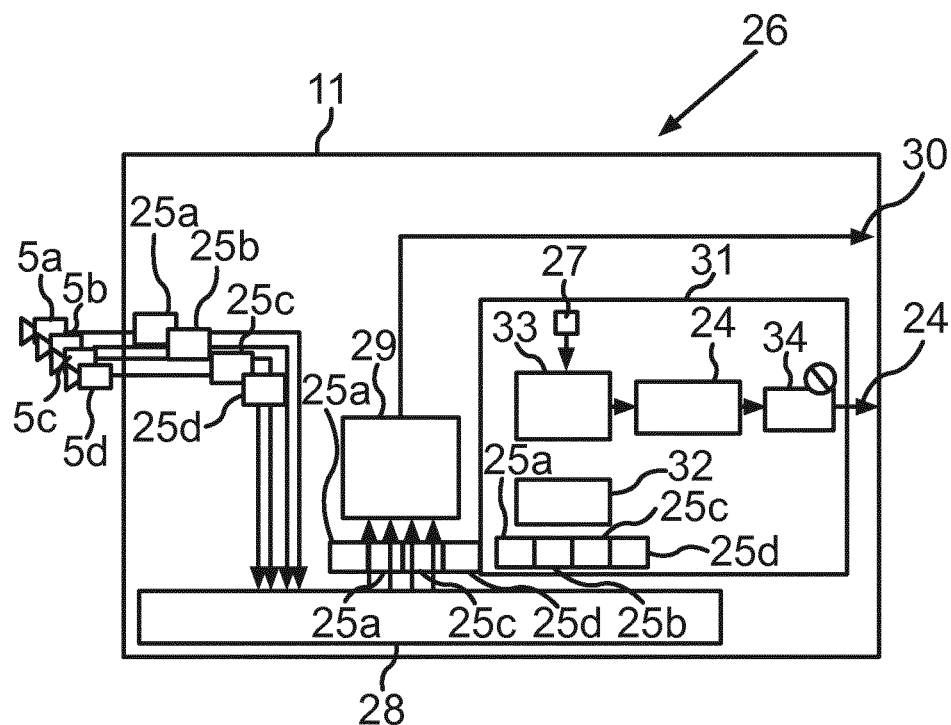
Figure 6:
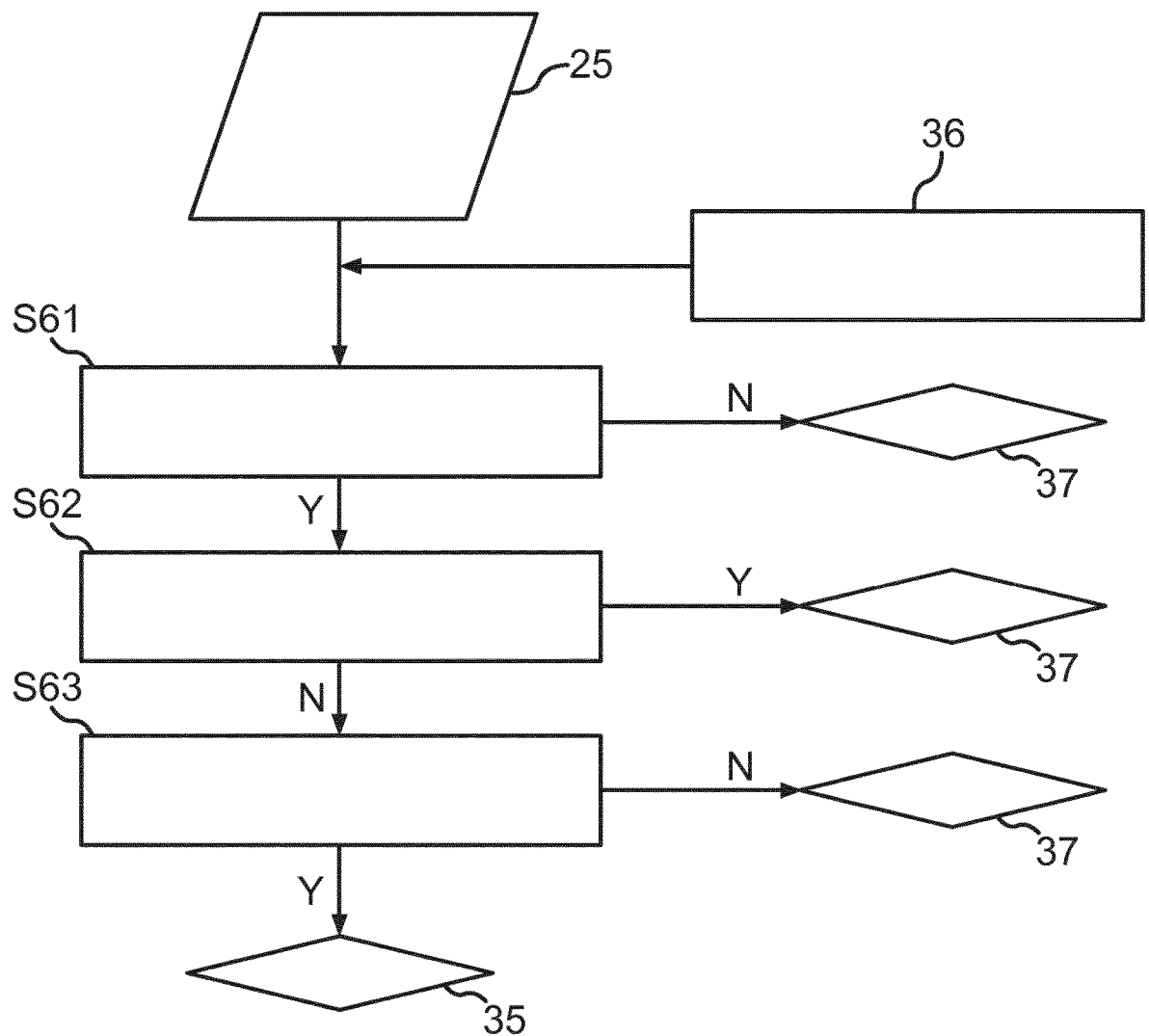
Figure 8:
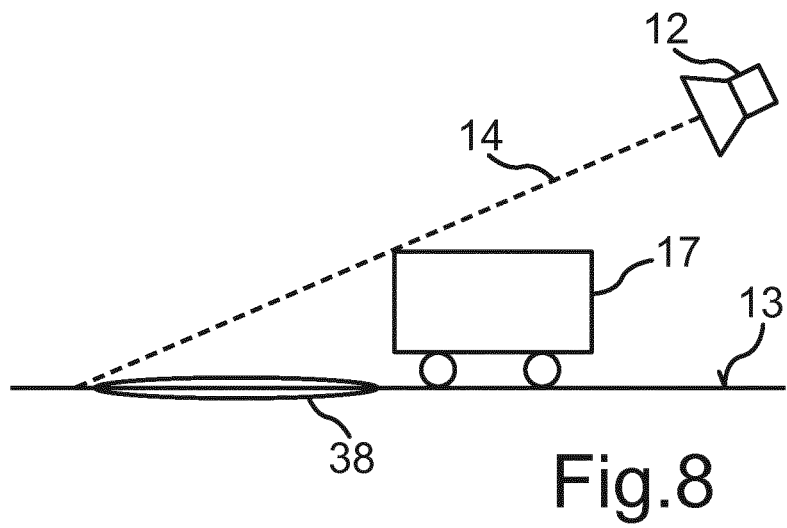
Figure 9:
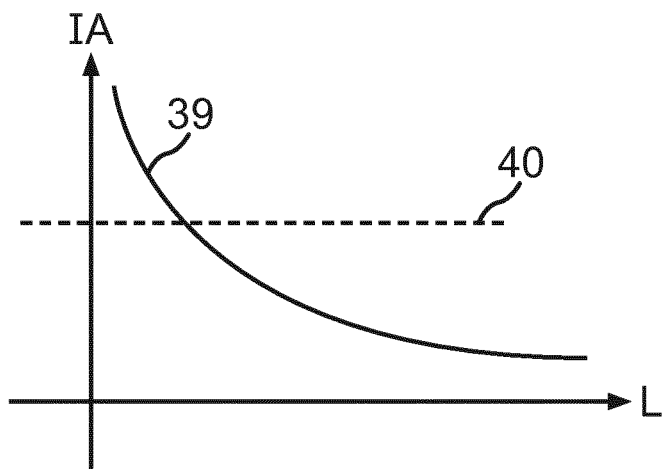
Figure 10:
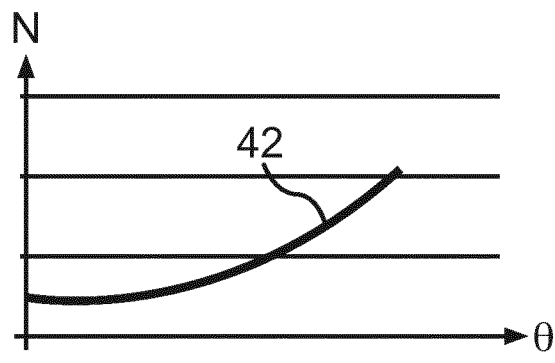
Figure 11:
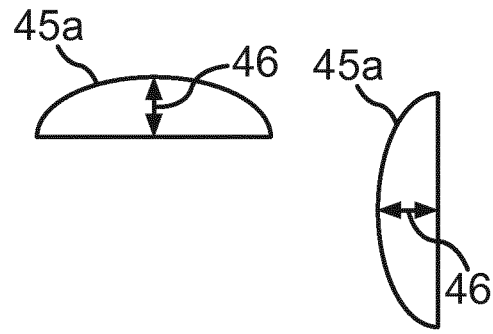
Figure 12:
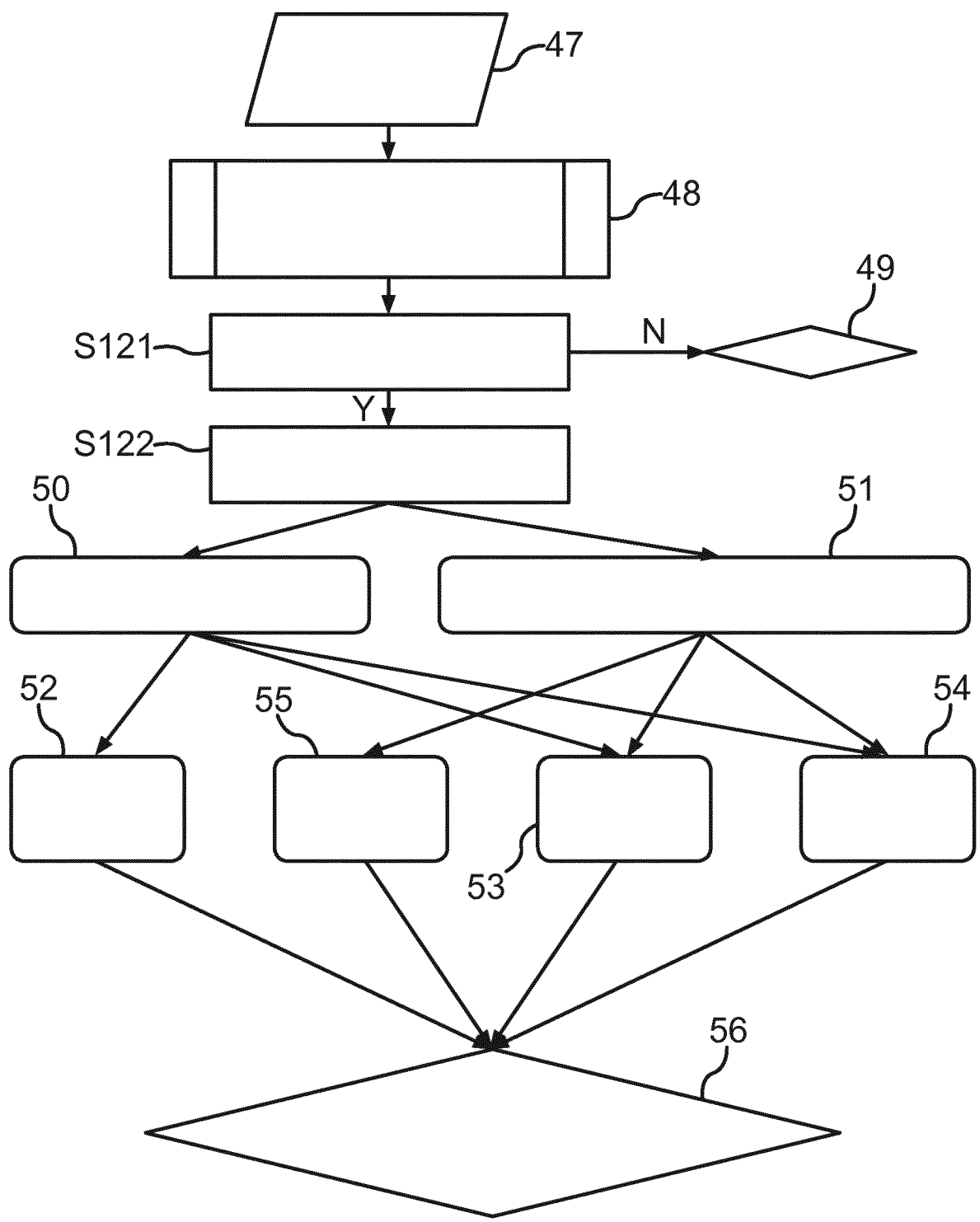
Figure 13:
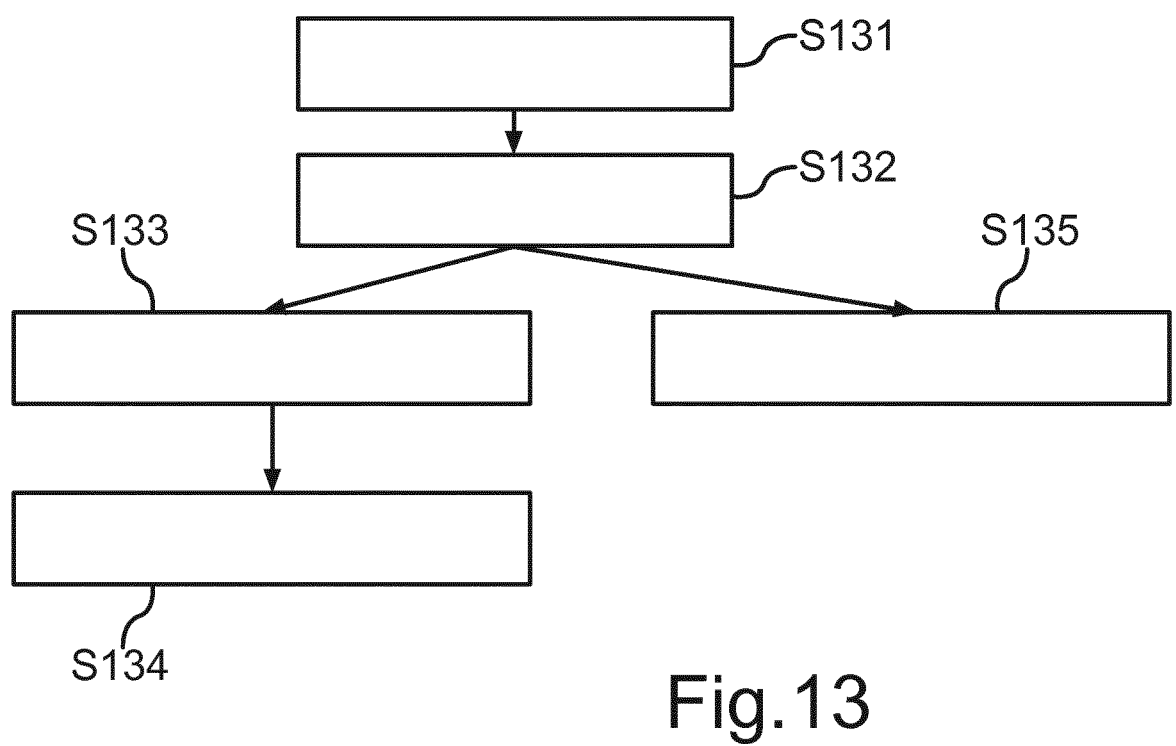

These show in:

FIG. 1 a schematic representation of an embodiment of a motor vehicle according to the invention;

FIG. 2a to 2c schematic representations of different perspectives of a virtual camera during detection of the motor vehicle;

FIG. 3 a schematic representation of a curved surface for producing a merged perspective viewing image in a so-called "bowl view";

FIG. 4 a schematic representation of a general image pipeline for producing merged perspective viewing images;

FIG. 5 a schematic representation of a further image pipeline for producing merged perspective viewing images;

FIG. 6 a schematic representation of a flow chart of an embodiment of a method according to the invention;

FIG. 7a to 7d schematic representation of a pixel density map for identifying disturbing signals within a merged perspective viewing image;

FIG. 8 a schematic representation of a model of the motor vehicle and of a virtual camera;

FIG. 9 a schematic representation of a relation of the disturbing signals on positions in an environmental region of the motor vehicle;

FIG. 10 a schematic representation of an experimentally detected relation between a number of a pixel occupation and an angle of incidence to the optical axis of one of the vehicle-side cameras;

FIG. 11 schematic illustrations of shapes of disturbing signal afflicted image areas;

FIG. 12 a schematic representation of a flow chart for determining disturbing signal indicators for a camera system in a pre-product stage; and FIG. 13 a schematic representation of a flow chart for determining a source of disturbing signals.

In the figures identical as well as functionally identical elements are provided with the same reference characters.

FIG. 1 shows an embodiment of a motor vehicle 1 according to the present invention. In the present case, the motor vehicle 1 is designed as a passenger car. The motor vehicle 1 comprises a driver assistance system 2 which can assist a driver of the motor vehicle 1 during the driving of the motor vehicle 1, for example during parking. The driver assistance system 2 comprises a camera system 3 for monitoring an environmental region 4 of the motor vehicle 1. Here, the camera system 3 is designed as a surround view camera system. The camera system 3 comprises four cameras 5a, 5b, 5c, 5d arranged on the motor vehicle 1. A first camera 5a, a front camera, is arranged in a front region 6 of the motor vehicle 1 and serves for detecting raw images from the environmental region 4 in front of the motor vehicle 1. A second camera 5b, a rear camera, is arranged in a rear area 7 of the motor vehicle 1 and serves for detecting raw images from the environmental area 4 behind the motor vehicle 1. A third camera 5c is arranged on a left side 8 of the motor vehicle 1 and serves for detecting raw images from the environmental area 4 to the left of the motor vehicle 1. A fourth camera 5d is arranged on a right side 9 of the motor vehicle 1 and serves for detecting raw images from the environmental area 4 to the right of the motor vehicle 1. The left and right cameras 5c, 5d are, in particular, side mirror cameras which can be arranged on or in the place of side mirrors on the motor vehicle 1. The cameras 5a, 5b, 5c, 5d comprise, in particular, fish eye lenses for expanding their respective detection range.

The raw images or raw video frames detected by the cameras 5a, 5b, 5c, 5d can be displayed on a display device 10 of the driver assistance system 2, for example a screen, in the form of a video or a video sequence. The raw images can also be fed to an image processing device 11 of the driver assistance system 2, which merges the raw images into perspective viewing images. The image processing device 11 can, for example, be integrated in a vehicle-side control device or ECU. The merged perspective viewing images may alternatively or in addition to the raw images be displayed on the display device 10.

The merged perspective viewing images show the motor vehicle 1 as well as the environmental region 4 of the motor vehicle 1 from dynamically variable perspectives P1, P2, P3 of a virtual camera 12. In FIG. 2a, 2b, 2c, the virtual camera 12 is shown while detecting the motor vehicle 1 from different perspectives P1, P2, P3. According to FIG. 2a, the virtual camera 12 is located directly above the motor vehicle 1 and looks from a first perspective P1 perpendicularly downwards onto the motor vehicle 1 as well as onto a road surface 13 of the motor vehicle 1. The motor vehicle 1 as well as the road surface 13 are projected orthogonally onto a projection surface of the virtual camera 12. In the case of the orthogonal projection, visual rays 14 from the environmental region 4 thus meet at right angles on the projection surface of the virtual camera 12. According to FIG. 2b, the virtual camera 12 is also located directly above the motor vehicle 1 and looks from a second perspective P2 vertically downwards on the motor vehicle 1 as well as on the road surface 13 of the motor vehicle 1. According to FIG. 2b, the motor vehicle 1 as well as the road surface 13 are projected perspectively onto the projection surface of the virtual camera 12 so that the visual rays 14 meet, in particular, at one point on the projection surface of the virtual camera 12. A perspective image in the form of a top view or a top view image can be created by the perspectives P1 and P2. The perspectives P1 and P2 are therefore the same, only the projection type is different. Since a perspective effect does not appear within a top view, it cannot be visually determined whether it is an orthogonal projection, as in FIG. 2a, or a perspective projection as in FIG. 2b.

According to FIG. 2c, the virtual camera 12 is located obliquely behind, above the motor vehicle 1, and is looking obliquely downward from a third perspective P3 on the motor vehicle 1 as well as on the road surface 13 of the motor vehicle 1. By means of the perspective P3, for example, a rear view of the motor vehicle 1 can be generated. The motor vehicle 1 as well as the road surface 13 are projected perspectively onto the projection surface of the virtual camera 12. In contrast to the perspectives P1 and P2, a perspective effect occurs within the perspective viewing image at the third perspective P3.

In order to provide different perspectives P1, P2, P3 for the virtual camera 12 during the detection of the motor vehicle 1, the virtual camera 12 can dynamically fly from a first position A to a second position B, as shown in FIG. 3, and can continuously capture the perspective viewing images. In order to generate the perspective viewing images, the raw images of the real cameras 5a, 5b, 5c, 5d can be projected onto a curved surface 16, whereby a model 17 of the motor vehicle 1 can be positioned at any desired position within the curved surface 16. In particular, the model 17 of the motor vehicle 1 is positioned in the center of the curved surface. The curved surface 16 can, for example, be determined via a polynomial of the fourth degree. The model 17 of the motor vehicle 1 is intended to represent the real motor vehicle 1, which cannot be detected by the cameras 5a, 5b, 5c, 5d.

FIG. 4 shows a schematic representation of a general image pipeline 18 or video pipeline, which is represented by a set of components 19, 20, 21, 22, 23. By means of the video pipeline 18, merged perspective viewing images 24 can be generated on the basis of raw images 25 or raw video frames taken by the cameras 5a, 5b, 5c, 5d of the surround view camera system 3. Light from the environmental region 4 is projected onto an image sensor unit 20 of the cameras 5a, 5b, 5c, 5d via the lenses 19 of the cameras 5a, 5b, 5c, 5d, for example the fish eye lenses. The image sensor unit 20 can, for example, comprise an imager and a microprocessor, for example, a companion chip. The image sensor unit 20 outputs the raw images 25 by means of integrated image quality adjustment functions 21 of the cameras 5a, 5b, 5c, 5d, for example an integrated edge enhancement or contrast enhancement. Based on the raw images 25 and based on calibration and virtual camera settings 23, a computing device 22, which for example can be integrated into the vehicle-side image processing device 11, generates the merged perspective viewing images 24. The perspective images 24 can be provided to the display device 10 for display.

FIG. 5 shows a representation of a concrete video pipeline 26 for producing a merged perspective viewing image 24 with a point at which disturbing signals 27 are introduced into the merged perspective viewing image 24. In particular, when the motor vehicle 1 and/or the virtual camera 12 move, the merged perspective viewing image 24 or the continuous sequence of images 24 comprises disturbing signals 27 or aliasing, for example in the form of artificial flicker effects. These disturbing signals 27 are dependent on the cameras 5a, 5b, 5c, 5d, in particular on their resolution. The disturbing signals 27 can occur at each resolution level. However, the disturbing signals 27 are significantly more visible at high resolution cameras 5a, 5b, 5c, 5d than at low resolution cameras 5a, 5b, 5c, 5d. The disturbing signals 27 or the aliasing effect is mainly a spatial effect, this effect worsening as the motor vehicle 1 moves.

The raw images 25a, 25b, 25c, 25d detected by the cameras 5a, 5b, 5c, 5d are fed to the image processing device 11. In particular, no disturbing signals 27 are present within the raw images 25a, 25b, 25c, 25d or are not or hardly visible. The raw images 25a, 25b, 25c, 25d can be stored in a memory unit 28 or a RAM (direct access memory). The stored raw images 25a, 25b, 25c, 25d can be provided to a processing unit 29 for machine vision, which analyzes the raw images 25a, 25b, 25c, 25d. A parallel path for machine vision systems is thus provided via the processing unit 29. The raw images 25a, 25b, 25c, 25d can, for example, be analyzed with the aid of algorithms for machine vision with regard to objects in the environmental region 4 in order to output object-based information 30. The object-based information 30 can also be displayed to the driver on the display device 10.

The raw images 25a, 25b, 25c, 25d can be supplied to a digital signal processor 31 with a pre-filter 32 for filtering the raw images 25a, 25b, 25c, 25d and an image renderer 33 or an image generation unit for producing the merged perspective viewing image 24. The disturbing signals 27 are introduced, in particular, by the image renderer 33 so that the merged perspective viewing image 24 here comprises the disturbing signals 27. Here, despite the application of a post-filter 34 to the merged perspective viewing image 24, the disturbing signals 27 cannot be removed from the merged perspective viewing image 24. These merged perspective viewing images 24, which are afflicted with the disturbing signals 27 in the form of artificial flicker effects, can be perceived as disturbing when they are displayed to the driver on the display device 10. These disturbing signals 27 can be reduced by means of anti-aliasing. In this case, the disturbing signals 27 can be reduced, for example, by pre-filtering the raw images 25a, 25b, 25c, 25 and/or by post-processing the perspective viewing images 24.

It is first checked whether a reduction of the interfering signals 27, i.e. an anti-aliasing, is necessary at all. A flowchart for determining the need for anti-aliasing is shown in FIG. 6. In this case, a review is made as to whether the disturbing signals 27 are inserted into the perspective viewing image due to merging the raw images 25 by means of the parameters 36 which describe the perspective of the virtual camera 12 for generating a specific target view of the perspective viewing image 24 as well as the information about the model 17 of the motor vehicle 1. It is thus checked whether a result step 35 for reducing the disturbing signals 27 is to be carried out. For example, it can first be checked in a step not shown here whether disturbing signals 27 are to be expected at all. This means, for example, that it is checked whether disturbing signals 27 are to be expected at all under the given environmental conditions in the environmental region 4 of the motor vehicle 1, and whether the merged perspective viewing image 24 will thus comprise at least one disturbing signal afflicted image area.

It may happen that in the case of a wet road surface 13 of the motor vehicle 1, for example due to rain, the disturbing signals 27 are small and therefore are not or only barely visible. A cover of the camera lenses 19 by a water film also weakens the aliasing effect. In addition, aliasing is hardly visible in the perspective viewing images 24 at low light intensity and thus at low brightness of the road surface 13, for example at night. Also, the aliasing effect is not visible in a shadow of the motor vehicle 1 because of the low light intensity in the shadow region. In addition, the aliasing effect may not occur with certain road surfaces 13, which for example have particularly small or particularly large gravel pieces. If a presence of visible disturbing signals 27 can already be excluded on the basis of the detected environmental conditions in the environmental region 4, the anti-aliasing may be omitted. The result step 35, in which the disturbing signals 27 are reduced, is thus not carried out.

In a step S61 of the method according to FIG. 6, a significance of the disturbing signals 27 can be determined in the at least one disturbing signal afflicted image area in the merged perspective viewing image 24. The significance expresses, for example, whether the at least one image area in the image 24 is large enough for the disturbing signals 27 to be visible at all. The significance is therefore used to predict a geometrical parameter of the at least one disturbing signal afflicted image area, for example a size, a shape and a position of the image area in the perspective viewing image 24. The shape, size and position of the disturbing signal afflicted image area are in particular dependent on the view of the motor vehicle 1 and of the environmental region 4 provided by the image area 24, and thus on the perspective P1, P2, P3 of the virtual camera 12. The significance is thus a parameter which is dependent on the virtual camera 12 and describes how the disturbing signal afflicted image area changes as a function of the current perspective P1, P2, P3 of the virtual camera 12. For example, a shape of the disturbing signal afflicted image area can change from the first perspective P1 to the third perspective P3 of the virtual camera 12. Additionally it can be that a disturbing signal afflicted image area, which images an environmental sub-region in front of the motor vehicle 1, has a first magnitude in the perspective viewing image in the form of the top view in the perspectives P1 and P2 and has a second size smaller than the first size in the perspective viewing image in the form of the rear view in the perspective P3.

If the significance, for example the size of the image area, falls below a predetermined significance-threshold (N), no anti-aliasing is performed in a result step 37. If the significance exceeds the predetermined significance-threshold (Y), the method is continued in a step S62. In the step S62, a check is made as to whether the disturbing signal afflicted image area is hidden by the perspective model 17 of the motor vehicle 1. The model 17 of the motor vehicle 1 is shown by way of example with reference to FIG. 8, the virtual camera 12 being located above and obliquely behind the model 17 of the motor vehicle 1. A region 38 in front of the model 17 of the motor vehicle 1 is not visible to the virtual camera 12. The visual rays 14 of the virtual camera 12 thus only hit the road surface 13 behind this region 38. If this region 38 corresponds to the disturbing signal afflicted image area, it is hidden by the model 17 of the motor vehicle 1 in the perspective viewing image 24 and is thus not visible, even if the disturbing signals 27 in the disturbing signal afflicted image region were significant enough. Thus, whether or not the disturbing signal afflicted image area is covered by the model 17 of the motor vehicle 1 also depends on the current perspective P1, P2, P3 of the virtual camera 12. At a perspective P1, P2 of the virtual camera 12, by which a top view is generated, in particular, no image area, which shows an environmental sub-region of the environmental region 4 adjoining the motor vehicle 1, is concealed. In the event that the model 17 is at least half-transparent, however, the region 38 and thus the disturbing signals 27 could nevertheless be visible. Therefore, a degree of coverage can be determined between the model 17 and the disturbing signal afflicted image area by which both the transparency of the model 17 and the perspective shape of the model can be taken into account.

Thus, if the disturbing signal afflicted image area is blocked or covered by the model 17 of the motor vehicle 1, i.e. if the degree of coverage exceeds a predetermined degree of coverage-threshold, the result step 37 is performed and the anti-aliasing is blocked. If the disturbing signal afflicted image area is not covered (N) by the perspective model 17 of the motor vehicle 1, i.e. if the degree of coverage-threshold is undershot, the method is continued in a step S63. In the step S63, a severity of the disturbing signals 27 is determined. The severity of the disturbing signals 27 is dependent on the real cameras 5a, 5b, 5c, 5d of the camera system 3 of the motor vehicle 1, in particular of extrinsic and intrinsic camera parameters of the cameras 5a, 5, 5c, 5d. In addition, in step S63, the severity of the disturbing signals 27 is compared with a predetermined severity-threshold. If the severity drops below the severity-threshold (N), the result step 37 is carried out and a reduction of the disturbing signals 27 is omitted. If the severity exceeds the severity-threshold (Y), the result step 35 is carried out and the disturbing signals 27 are reduced. The steps S61, S62, S63 can also be carried out in a sequence other than the one shown here.

A so-called disturbing signal indicator or aliasing indicator IA (see FIG. 9) can be determined to predict whether disturbing signals 27 will occur at all in the merged image 24 and to determine the severity of the disturbing signals 27. As the disturbing signal indicator IA, for example, a pixel density map PDM as shown in FIG. 7a, 7b, 7c, 7d can be determined. The pixel density provides a possibility to calculate how many camera pixels or image points of the raw images 25 are used to image a specific portion of the environmental region, for example an environmental sub-region or a target region, in the perspective viewing image 24. Pixel density is a ratio in the unit pixel per length or pixel area per image area, or vice versa. The calculation of the pixel density is particularly advantageous, since a sampling rate of the real cameras 5a, 5b, 5c, 5d can be measured on the basis of this for the representation of a specific environmental sub-region, a so-called region of interest. This region of interest is in particular a region on the road surface 13, which usually has gravel or crushed stone. Due to this gravel-covered road surface 13, high-frequency changes of pixel values can occur during the detection of the target region by the cameras 5a, 5b, 5c, 5d. In this case, the sampling rate provided by the cameras 5a, 5b, 5c, 5d cannot meet the critical sampling frequencies necessary for restoring all the details on the road surface 13, for example the gravel, and, thus, the disturbing signals 27 are inserted in the perspective viewing image 24.

The pixel density map shown in FIG. 7a, 7b, 7c, 7d shows the spatial distributions of the pixel densities. The pixel density regions B1, B2, B3, B4 with different pixel densities are shown in FIG. 7a, 7b, 7c, 7d. The pixel density range B1 comprises the pixel densities with the highest value, the pixel density range B4 comprises the pixel densities with the lowest value. The pixel density regions with the highest pixel density values, for example, the pixel density regions B1 and B2, correspond to the disturbing signal afflicted image areas in the merged image 24. The pixel density map PDM can thus be used to determine whether disturbing signals 27 will occur at all, additionally the positions of the disturbing signal afflicted images areas can be identified based on the pixel density map PDM. A maximum value of the pixel densities, i.e. the value of the pixel density in the pixel density range B1, can be determined as the severity of the disturbing signals 27.

The pixel densities P dependent on the cameras 5a, 5b, 5c, 5d can be calculated, for example, by the following formula:

$$P = \frac{(f_1 + f_2\theta + 3f_3\theta^2 + 4f_4\theta^3)^2}{(x_p - x_c)^2 + (y_p - y_c)^2 + (z_p - z_c)^2}.$$

$f_1$, $f_2$, $f_3$, $f_4$ are fish eye coefficients of the camera 5a, 5b, 5c, 5d, $\theta$ is the incident angle of the light to the camera 5a, 5b, 5c, 5d, $(x_c, y_c, z_c)$ is the position of the camera 5a, 5b, 5c, 5d defined by the extrinsic camera parameters, and $(x_p, y_p, z_p)$ is any position that the pixel density is calculated for. For ground points, the coefficient $z_p=0$.

The inverse 1/P of the pixel density P may be useful to transform the pixel density data ranges. By means of a normalized pixel density P, the peak value or the maximum pixel density value of the pixel density P can be normalized to 1.

Figure 7A:
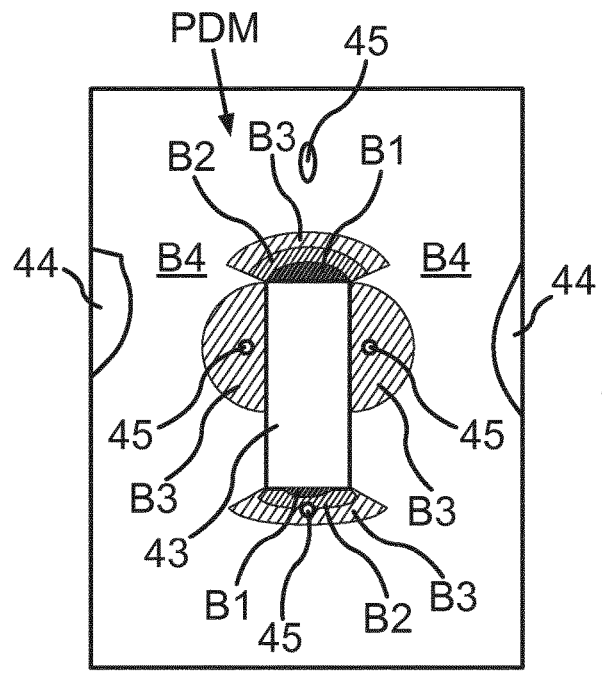

FIG. 7a shows, by way of example, intersection surfaces 41 of camera axes of the respective camera 5a, 5b, 5c, 5d. FIG. 10 shows an experimentally ascertained relationship between a number N of a pixel occupancy and an angle of incidence $\theta$ to an optical axis or camera axis of one of the vehicle-side cameras 5a, 5b, 5c, 5d. Thus the pixel density or values of the pixel density can be influenced via the extrinsic camera parameters. Thus, there is an optimum position for each camera 5a, 5b, 5c, 5d on the motor vehicle 1, by which aliasing can be attenuated. However, since a height of the cameras 5a, 5b, 5c, 5d is usually stable on the motor vehicle 1, a location of the pixel density can be changed by the extrinsic camera parameters, but not the distribution. If the pixel density condition is met, aliasing can occur at any time.

FIG. 7a, 7b, 7c, 7d also show that the virtual camera 12 influences the aliasing effect. The interfering signal indicator IA determined as the pixel density map PDM is influenced, in particular, by the perspective P1, P2, P3 of the virtual camera 12, in that the pixel density regions B1, B2, B3, B4, for example, change their size, shape and/or position. According to FIG. 7a, the pixel density regions B1, B2, B3, B4 are shown for a perspective in which the virtual camera 12 is located vertically above the motor vehicle 1 at a first distance above the motor vehicle 1. According to FIG. 7b, the pixel density regions B1, B2, B3, B4 are shown for a perspective in which the virtual camera 12 is located in a second distance, which is larger than the first distance, vertically above the motor vehicle 1. Due to the larger second distance, the size of the pixel density regions B1, B2, B3 and thus also the disturbing signal afflicted image area decreases in the perspective viewing image 24. According to FIG. 7c, the pixel density regions B1, B2, B3, B4 are shown for a perspective in which the virtual camera 12 is located obliquely behind and above the motor vehicle 1 and looks obliquely downwards on the motor vehicle 1. According to FIG. 7d, the pixel density regions B1, B2, B3, B4 are shown for a perspective in which the virtual camera 12 is located behind the motor vehicle 1 and looks at the rear region 7 of the motor vehicle 1 forwardly in the direction of the front region 6 of the motor vehicle 1.

Figure 7B:
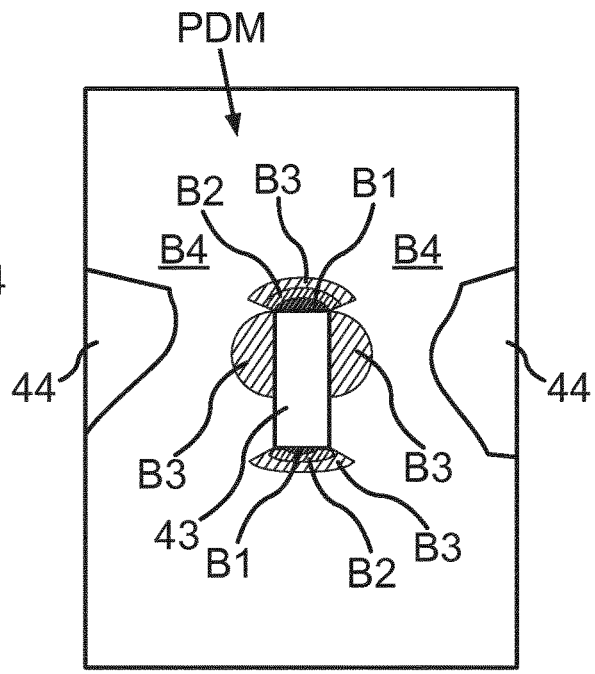
Figure 7C:
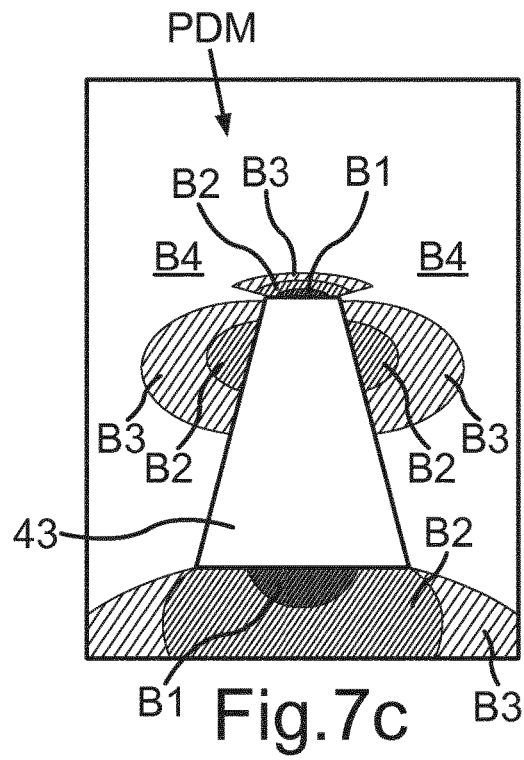
Figure 7D:
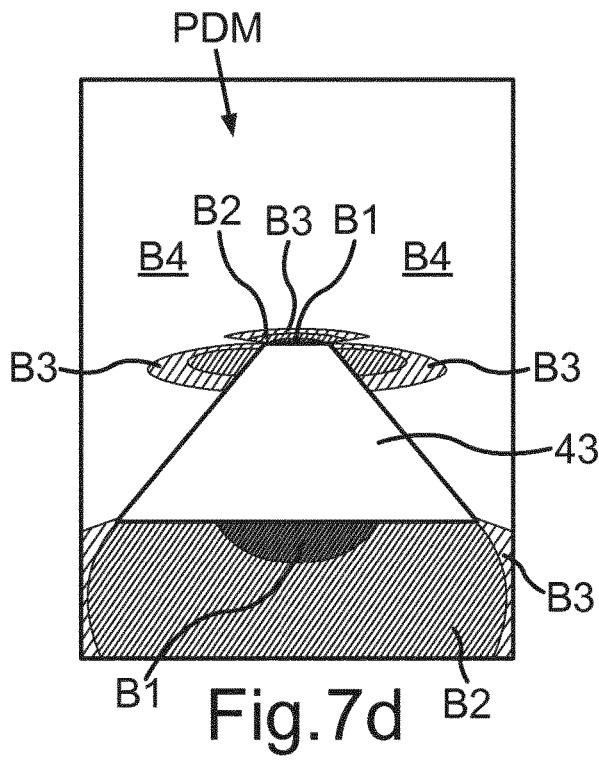

A region 43 in FIG. 7a, 7b, 7c, 7d shows the region covered by the motor vehicle 1. The model 17 of the motor vehicle 1 will be located in the image area of the perspective viewing image 24 corresponding to the region 43. It is also apparent that the region 43 changes with the perspective P1, P2, P3 of the virtual camera 12. Thus, the model 17 of the motor vehicle 1 will also change with the perspective P1, P2, P3 of the virtual camera 12. The regions 44 according to FIGS. 7a and 7b are regions which correspond to environmental sub-regions in the environmental region 4 which cannot be detected by any of the cameras 5a to 5d so that no image information is available for these environmental sub-regions in the environmental region 4. These image regions can, for example, be marked or artificially generated on the display device 10 when displaying the merged perspective viewing image 24, for example as a function of the adjacent image areas of the merged perspective viewing image 24.

The size of the pixel density regions B1, B2, B3, B4 changed by the perspective P1, P2, P3 of the virtual camera 12 corresponds to a changed size of the image areas in the merged image 24. The closer an area is to the virtual camera 12, the more pixels are occupied by this area in the perspective viewing image. If the size of the pixel density region B1 changes as a result of the configuration of the virtual camera 12, i.e. for example, as a result of the perspective of the virtual camera 12, the disturbing signal afflicted image area also changes its size. The size of the disturbing signal afflicted image area can for example be determined as the significance of the disturbing signals 27.

For example, the size or area of the disturbing signal afflicted image area can be calculated using the following formula:

$$A_v = \frac{A_s d^2}{R^2 \cos^2 \theta}.$$

$A_v$ is the area of pixels, which is occupied in the merged image of the virtual camera, i.e. the area of the disturbing signal afflicted image area. $A_s$ is a round region in the environmental region 4 captured by the virtual camera 12, for example on the road surface 13, d is a zoom length of the virtual camera 12 in millimeters, R is the distance of the region from the position of the virtual camera 12 and $\theta$ is the incident angle of the visual ray 14 onto the projection surface of the virtual camera 12. It can be seen that the occupied pixel area of the virtual camera 12 is inversely proportional to the distance square of the area region or regions of interest. This explains that the same size of a region of interest remote from the virtual camera 12 is much smaller than the region close to the virtual camera 12. If the area is small enough, for example, less than 300 pixels square, there is no need for anti-aliasing. Thus the significance can be determined from the value of the area $A_v$. On the basis of the significance it can then be assessed whether a reduction of the disturbing signals 27 is to be carried out or not.

In FIG. 11 shapes 45a, 45b for disturbing signal afflicted image areas are shown, which can be determined by means of the pixel density map PDM. The shape 45a corresponds to a disturbing signal afflicted image area in front of the motor vehicle 1, and the shape 45b corresponds to a disturbing signal afflicted image area to the left of the motor vehicle 1. The disturbing signal afflicted image areas can have, for example, a width 46 of fifty pixels. The shapes 45a, 45b are thereby determined in the top view, i.e., for example, with reference to FIG. 7a, on the basis of the pixel map PDM. These shapes 45a, 45b can vary by the perspective of the virtual camera 12. For example, the width 46 of the shape 45a of the virtual camera 12 according to FIG. 7c and FIG. 7d can be reduced in comparison with the plan view in FIG. 7a, whereas a width of an area behind the motor vehicle 1 increases.

Further disturbing signal indicators IA, on the basis of which disturbing signal free image areas can be distinguished from disturbing signal afflicted image areas, can be calculated by means of statistical dispersion. Since pixel values vary more within a disturbing signal afflicted image area than in image areas free of disturbing signals, the variation of the pixel values within the pixel array can thus also be calculated. The statistical dispersion can be determined, for example, in statistical metrics or statistical indices, for example the data range, standard deviation, distance standard deviation, average absolute deviation, Coefficient of variation, relative mean difference, etc. The larger the values of the indices, the more scatter the data or pixel values. The severity of the disturbing signals 27 can, for example, be determined via the relative values of the statistical indices. For example, the standard deviation of the brightness values of pixels can be considered. The standard deviation of the brightness values has a first value, for example 24.3, in a disturbing signal afflicted image area, whereas the standard deviation in the same area without interference signals 27 has a second value which is smaller than the first value, for example 7.5. The second value can, for example, serve as a target value, which is to be determined by the statistical measure after the execution of anti-aliasing.

Since the aliasing effect affects high-frequency changes, an analysis of the effect in the frequency domain can also serve as a disturbing signal indicator. Frequency analyzes in the local frequency range within a raw image 25 or within a perspective viewing image 24 as well as frequency analyzes in the temporal frequency range can be carried out within a temporal series or sequence of raw images 25 or perspective viewing images 24, respectively.

In FIG. 9, a course 39 of the disturbing signal indicator IA is plotted over locations L of the regions of interest. When the disturbing signal indicator IA exceeds a predetermined threshold value 40, this means that the disturbing signals 27 are severe enough to be visible in the image area corresponding to the region of interest. The course 39 shown in FIG. 9 can be the course of any of the already described disturbing signal indicators IA, for example the pixel density map PDM or a statistical index.

In order to carry out anti-aliasing in the result step 35 according to FIG. 6, for example, a built-in contrast enhancement and/or edge enhancement of at least one of the cameras 5a, 5b, 5c, 5d can be suppressed or attenuated. Before the final perspective viewing image 24 is created, the cameras 5a, 5b, 5c, 5d typically perform certain preprocessing procedures, such as local edge sharpening operations and/or contrast enhancement operations, to improve a visual quality of the final image 24. Such contrast and edge enhancement increase an apparent sharpness of an image or a visual acuity. When the edge enhancement and/or the contrast enhancement is applied to the raw images 25 prior to the generation of the image 24, the aliasing effect can thereby be exacerbated. The edge enhancement and/or contrast enhancement does not produce the aliasing effect, but rather enhances the already existing effect.

The aliasing effect or the disturbing signals 27 can be significantly reduced by switching off or at least attenuating the integrated enhancement functions of at least one of the cameras 5a, 5b, 5c, 5d. Preferably, the edge enhancement and/or the contrast enhancement is switched off locally for the image areas which contribute to the disturbing signal afflicted image area, while the enhancement functions remain switched on for other image areas.

Alternatively or additionally, an optical method for reducing disturbing signals 27 can be performed. The optical lenses 19, for example fish eye lenses, of the cameras 5a, 5b, 5c, 5d are designed to change frequency components in the raw images 25. To reduce the disturbing signals 27 in the merged image 24, the optical fish eye lenses 19 can be slightly offset from their nominal positions to provide defocused cameras 5a, 5b, 5c, 5d. Thus, a focusing error is generated in the cameras 5a, 5b, 5c, 5d. This produces a certain amount of optical blur and aliasing at high frequency can be reduced.

Alternatively or additionally, an image processing method can be performed for processing the raw images 25 and/or the perspective viewing image 24 on pixel level. This can help to filter high-frequency aliasing. Applying conventional image processing methods to high-frequency filters such as down-sampling, neighborhood interpolation, and/or averaging on pixels (e.g., Luma part for the YUV image format) reduces the aliasing effect. This can be carried out on the raw images 25 and/or on the perspective viewing images 24, both spatially and temporally. In order to achieve a smooth transition in the perspective viewing image 24 between disturbing signal free and disturbing signal afflicted image areas, the filter can be restricted locally, for example by using the pixel density map PDM as a guide image.

FIG. 12 shows a flow chart by means of which it can be determined in a pre-product stage of a specific camera system 3 whether aliasing will occur at all in this specific camera system 3. For this purpose, in a pre-product stage of the camera system 3, in particular before delivery of the camera system 3 or of the motor vehicle 1 to the end customers of the motor vehicle 1, perspective test images are determined using test raw images 47 with configuration settings 48 of the virtual camera 12, the "bowl view" settings. In a step S121, it is determined whether the aliasing effect is significant in the perspective test images. If not (Y), a result step 49 is performed and an anti-aliasing algorithm is not provided for this specific camera system 3, since in this camera system 3 anti-aliasing is not considered necessary. If the aliasing effect is significant in the perspective test images, disturbing signal test indicators for determining the severity of the disturbing signals 27 are evaluated in a step S122. Test indicators 50 can be determined by means of the merged perspective test image and/or test indicators 51 can be determined by means of the test raw images 47.

Based on the merged test image, a screen area, which is occupied by a specific environmental sub-region, can be determined as a test indicator 52, for example. On the basis of the screen-dependent test indicator 52 it can be predicted whether the disturbing signals 27 are visible on the specific screen of the motor vehicle 1 at all. The frequency analysis of the pixel values can be determined as a test indicator 53 on the basis of the merged test image and/or on the basis of the test raw images 47 and the statistical measures described above can be determined as a test indicator 54. The pixel density can be determined as a further test indicator 55 on the basis of the test raw images 47. The measured values and threshold values, for example the severity-threshold and the significance-threshold, are determined from the test indicators 52, 53, 54, 55 in a result step 56, by means of which it is judged in this particular camera system 3 whether or not an anti-aliasing is performed.

In FIG. 13, a flowchart for determining a source of the aliasing effect is shown. When it has been detected in a first step S131 that aliasing occurs in the perspective viewing images 24, it is determined in a second step S132 whether the disturbing signals 27 result from the movement of the motor vehicle 1 or from the movement of the virtual camera 12. If it has been detected in a step S133 that the disturbing signals 27 result only from the movement of the virtual camera 12, a simplified anti-aliasing can be performed in a step 134. For example, in the step S134, averaging can be performed via the pixels of the raw images 25 or of the merged perspective image 24. When it has been detected in a step 135 that the aliasing also results from the movement of the motor vehicle 1, the disturbing signals 27 can be reduced, for example, by attenuating or deactivating the integrated edge enhancement functions and/or contrast enhancement functions of the cameras 5*a*, 5*b*, 5*c*, 5*d* and/or by generating the focusing error in the cameras 5*a*, 5*b*, 5*c*, 5*d* and/or by applying a filter.

The invention claimed is:

1. A method for generating at least one merged perspective viewing image, which shows a motor vehicle and an environmental region of the motor vehicle from a dynamically variable perspective of a dynamic virtual camera and which is determined based on raw images of at least two vehicle-side cameras and based on a perspective model of the motor vehicle dependent on the perspective of the virtual camera, comprising:
   a) determining whether the merged perspective viewing image comprises at least one disturbing signal afflicted image area, and if so, identifying the at least one disturbing signal afflicted image area within the merged perspective viewing image;
   b) determining a severity of disturbing signals within the at least one disturbing signal afflicted image area;
   c) determining a significance of the disturbing signals in dependence on the perspective of the virtual camera, wherein the perspective corresponds to a view angle of the virtual camera with respect to the motor vehicle, wherein at least one geometric parameter of the image area is characterized by the significance based on the view angle of the virtual camera with respect to the motor vehicle;
   d) determining a degree of coverage of the disturbing signal afflicted image area, by the model of the motor vehicle to be inserted into the merged perspective viewing image, in dependence on the perspective of the virtual camera and a transparency of the model;
   e) reducing the disturbing signals for the merged perspective viewing image only, if the severity of the disturbing signals exceeds a predetermined severity-threshold and the significance of the disturbing signals exceeds a predetermined significance-threshold and the degree of coverage remains below a predetermined degree of coverage-threshold.

2. The method according to claim 1, wherein the disturbing signals are reduced within the raw images and/or the merged perspective viewing image, wherein the steps a) to d) are predictively performed on the basis of raw images prior to creating the merged perspective viewing image, in case the disturbing signals are reduced at least in the raw images.

3. The method according to claim 1, wherein the raw images are projected upon a predetermined curved surface, wherein the model of the motor vehicle is positioned at a predetermined position on the surface and the merged perspective viewing image is determined on the basis of the surface with the projected raw images and the model of the motor vehicle as well as based on perspective of the dynamic virtual camera.

4. The method according to claim 1, wherein in step a) at least one environmental condition comprising a texture of a road surface for the motor vehicle and/or a daytime and/or weather conditions are determined, and on the basis of at least one environmental condition it is predicted whether the merged perspective viewing image comprises the at least one disturbing signal afflicted image area.

5. The method according to claim 1, wherein in step a) a disturbing signal indicator is determined and on the basis of the disturbing signal indicator a presence of the at least one disturbing signal afflicted image area as well as a position of the at least one image area within the merged perspective viewing image is determined, wherein in step b) the severity of the disturbing signals is determined on the basis of the disturbing signal indicator.

6. The method according to claim 5, wherein as the disturbing signal indicator a pixel density map is determined in dependence on at least one camera parameter of the cameras, which describes an image area depending distribution of a number of pixels of the raw images contributing to the creation of the merged perspective viewing image, wherein a maximum pixel density value within the pixel density map is determined as the severity of the disturbing signals.

7. The method according to claim 5, wherein as the disturbing signal indicator at least one measure describing a statistical dispersion of pixel values is determined as function of a position of pixel in the raw images and/or in the merged perspective viewing image, wherein the severity of the disturbing signals is determined on the basis of a relative value of the at least one measure.

8. The method according to claim 5, wherein the disturbing signal indicator is determined by means of a frequency analysis of pixel values of the raw images and/or the merged perspective viewing image.

9. The method according to claim 5, wherein in dependence on a vehicle-side screen for displaying the merged perspective viewing image, as the disturbing signal indicator, respective screen areas corresponding to a certain environmental sub-region in the environmental region are determined and a size of that screen area is determined as the severity of the disturbing signals, which is occupied by the environmental sub-region corresponding to the disturbing signal afflicted image area during display on the screen.

10. The method according to claim 5, wherein a test disturbing signal indicator is determined during at least one test cycle, wherein a relation between positions of predetermined environmental sub-regions in the environmental region and values of the test disturbing indicator are determined, and the severity threshold is determined on the basis of the relation.

11. The method according to claim 1, wherein as the significance depending on the perspective of the dynamic virtual camera a size and/or a shape and/or a position of the at least one disturbing signal afflicted image area in the merged perspective viewing image corresponding to the perspective of the dynamic virtual camera is determined.

12. The method according to claim 1, wherein for reducing the disturbing signals in the merged perspective viewing image at least one of the following steps f) to h) is performed: f) suppressing or mitigating a contrast enhancement and/or an edge enhancement for the captured raw images in case of cameras equipped with integrated enhancement functions and determining the merged perspective viewing image on the basis of the raw images without the contrast enhancement and/or edge enhancement, g) generating focusing errors within the captured raw images and determining the merged perspective viewing image on the basis of the raw images with the focusing errors, h) applying a filter to pixels corresponding with the disturbing signal afflicted image area of the merged perspective viewing image and/or the raw images.

13. The method according to claim 1, wherein it is determined whether the disturbing signals result from a movement of the motor vehicle and/or a movement of the virtual camera, and in the case that the disturbing signals only result from a movement of the virtual camera, the disturbing signals are reduced by performing an averaging of adjacent pixels in the merged perspective viewing image.

14. A camera system for a motor vehicle comprising: at least two cameras for capturing raw images from an environmental region of the motor vehicle; and an image processing device, which is configured to perform a method according to claim 1.

15. A motor vehicle comprising a camera system according to claim 14.

* * * * *